US012585463B2

(12) United States Patent
Talmor et al.

(10) Patent No.: US 12,585,463 B2
(45) Date of Patent: Mar. 24, 2026

(54) SELECTIVE TRIGGERING OF CONTINUOUS INTEGRATION, CONTINUOUS DELIVERY (CI/CD) PIPELINES

(71) Applicant: RED HAT, INC., Raleigh, NC (US)

(72) Inventors: Avraham Avi Talmor, Rishon Leziyonn (IL); Arie Bregman, Gan Yavne (IL)

(73) Assignee: Red Hat, LLC, Raleigh, NC (US)

( * ) Notice: Subject to any disclaimer, the term of this patent is extended or adjusted under 35 U.S.C. 154(b) by 229 days.

(21) Appl. No.: 18/477,051

(22) Filed: Sep. 28, 2023

(65) Prior Publication Data

US 2025/0110728 A1 Apr. 3, 2025

(51) Int. Cl.
*G06F 8/71* (2018.01)

(52) U.S. Cl.
CPC ...................................... *G06F 8/71* (2013.01)

(58) Field of Classification Search
CPC ........................................................ G06F 8/71
See application file for complete search history.

(56) References Cited

U.S. PATENT DOCUMENTS

| | | | | | |
|---|---|---|---|---|---|
| 10,198,344 | B2 * | 2/2019 | Vyas | .................... | G06F 11/3688 |
| 11,288,061 | B1 * | 3/2022 | Johnson | ..................... | G06F 8/51 |
| 11,403,136 | B1 * | 8/2022 | Willson | ................... | G06F 9/541 |
| 11,693,650 | B2 * | 7/2023 | Thomas | .............. | G06F 11/0775 |
| | | | | | 717/120 |
| 11,726,854 | B2 * | 8/2023 | Bregman | ............ | G06F 11/3409 |
| | | | | | 714/48 |
| 12,001,327 | B2 * | 6/2024 | Bregman | ............ | G06F 11/3688 |
| 2020/0348921 | A1 | 11/2020 | Maréchal et al. | | |
| 2020/0387441 | A1 * | 12/2020 | Bregman | .............. | G06F 11/076 |
| 2022/0057999 | A1 | 2/2022 | Pitchai Muthu et al. | | |
| 2023/0086361 | A1 * | 3/2023 | Wan | ........................... | G06F 8/77 |
| | | | | | 702/186 |
| 2023/0138602 | A1 * | 5/2023 | Bregman | .................. | G06F 8/71 |
| | | | | | 717/170 |
| 2023/0145163 | A1 * | 5/2023 | Hoenzsch | ................. | G06F 8/60 |
| | | | | | 717/122 |
| 2023/0409305 | A1 * | 12/2023 | Bregman | .................. | G06F 8/60 |
| 2024/0160418 | A1 * | 5/2024 | Srivastava | ................ | G06F 8/34 |
| 2024/0193032 | A1 * | 6/2024 | Tang | ..................... | G06F 11/079 |

OTHER PUBLICATIONS

Dsouza, Davor, "GitLab CI/CD Triggers Simplified 101," Hevo Data Inc., Apr. 26, 2022, 14 pages. https://hevodata.com/learn/gitlab-ci-cd-trigger/#:~:text=GitLabCIFCDTriggerAThroughAPI,-Webhooksarea&text=ThisisparticularlyusefulforURLat-thedesiredinterval.

* cited by examiner

*Primary Examiner* — Douglas M Slachta
(74) *Attorney, Agent, or Firm* — Dority & Manning, P.A.

(57) ABSTRACT

A method of improving continuous integration, continuous delivery (CI/CD) pipelines includes receiving an indication of a failure of a CI/CD pipeline of a plurality of CI/CD pipelines. The method further includes processing build status information by a rule engine, the build status information indicative of builds executed within the plurality of CI/CD pipelines. The method further includes applying a set of rule to the build status information to select a subset of the plurality of CI/CD pipelines, wherein the set of rules includes one or more of a resource availability rule or a failure type rule. The method further includes executing the subset of CI/CD pipelines selected by the rule engine.

20 Claims, 4 Drawing Sheets

100

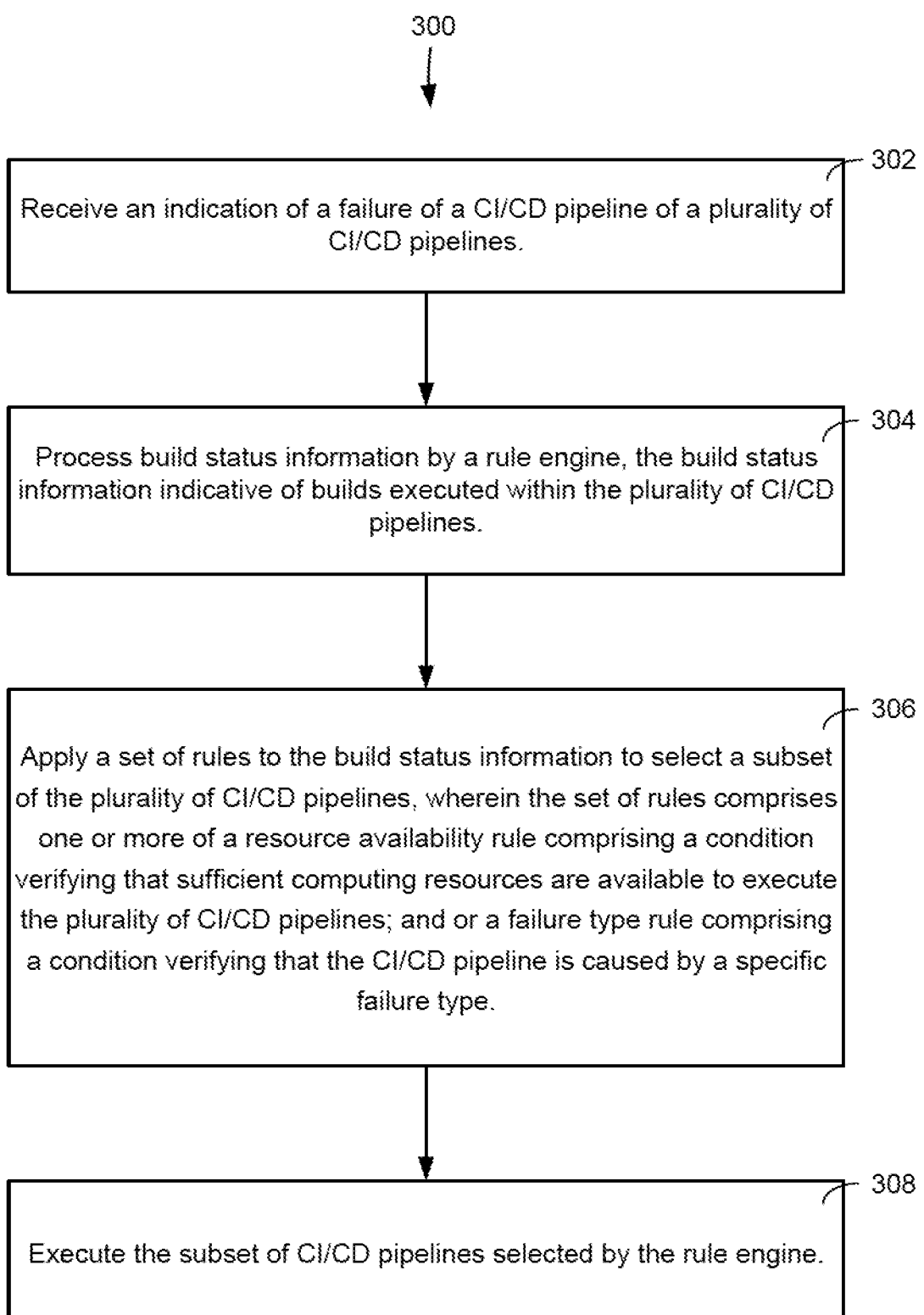

300

302

Receive an indication of a failure of a CI/CD pipeline of a plurality of CI/CD pipelines.

304

Process build status information by a rule engine, the build status information indicative of builds executed within the plurality of CI/CD pipelines.

306

Apply a set of rules to the build status information to select a subset of the plurality of CI/CD pipelines, wherein the set of rules comprises one or more of a resource availability rule comprising a condition verifying that sufficient computing resources are available to execute the plurality of CI/CD pipelines; and or a failure type rule comprising a condition verifying that the CI/CD pipeline is caused by a specific failure type.

308

Execute the subset of CI/CD pipelines selected by the rule engine.

FIG. 3

SELECTIVE TRIGGERING OF CONTINUOUS INTEGRATION, CONTINUOUS DELIVERY (CI/CD) PIPELINES

TECHNICAL FIELD

The present disclosure is generally related to build management, and more particularly, to improving pipeline execution within continuous integration, continuous delivery (CI/CD) systems.

BACKGROUND

In computer program development, continuous integration (CI) is the practice of merging developer working copies of computer program code for an application into a shared mainline code base periodically (e.g., several times a day, etc.). With CI, each developer team member submits source code for the application being developed on a frequent (e.g., daily, hourly, etc.) basis, and a set of operations ("a build process" or "build") is performed to produce executable code from the source code. The executable code may be for an application, for example. The set of operations for providing a build may include compiling source code files to produce the executable code for an application, performing tests on the executable code, and instating or deploying the executable code. The build process may be performed periodically, or with each significant source code change.

BRIEF DESCRIPTION OF THE DRAWINGS

The present disclosure is illustrated by way of examples, and not by way of limitation, and may be more fully understood with references to the following detailed description when considered in connection with the figures, which are described below.

FIG. 3 depicts a flow diagram of an example method for performing corrective action for failed builds in a CI/CD system, in accordance with one or more aspects of the present disclosure.

DETAILED DESCRIPTION

Figure 1:
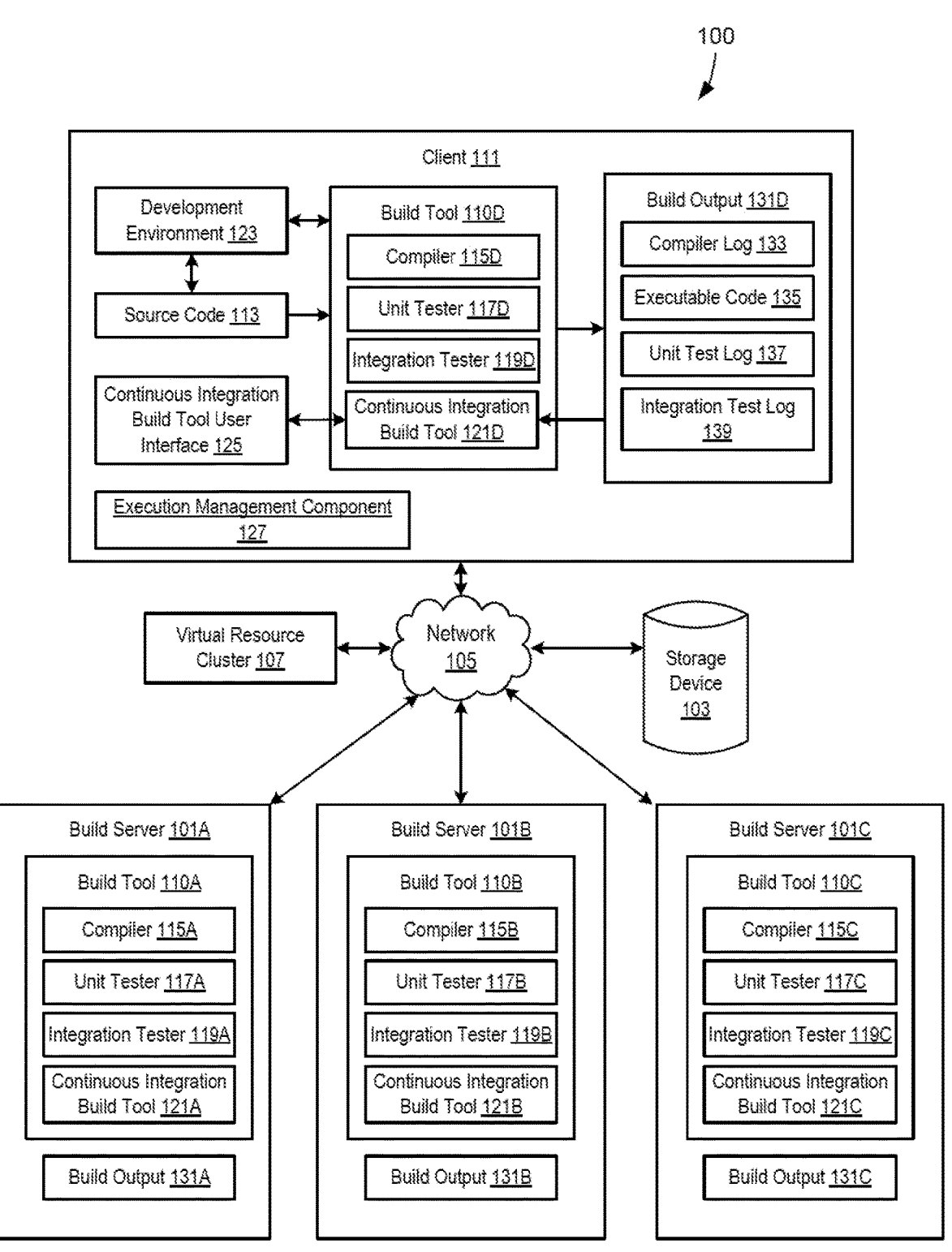
FIG. 1 depicts a high-level block diagram of an example computing environment that includes an execution management component, in accordance with one or more aspects of the present disclosure.

Described herein are methods and systems for selecting continuous integration continuous delivery (CI/CD) pipelines using a rule engine. CI/CD is a method to deliver application to customers by introducing automation into the stages of software (e.g., application) development. CI/CD is a solution to the problems integrating new code can cause for development and operations teams. CI/CD introduces ongoing automation and continuous monitoring throughout the software lifecycle, from integration and testing phases to delivery and deployment phases. Taken together, this sequence of operations is referred to as a "CI/CD pipeline"

and are supported by development and operations ("DevOps") teams working together in an agile way with either a DevOps or Site Reliability Engineering (SRE) approach.

For example, continuous delivery generally means that a developer's software changes are automatically bug tested and uploaded to a repository, where they can then be deployed to a live production environment by the operations team. Continuous delivery provides a solution to the problem of poor visibility and communication between developer and business teams. To that end, the purpose of continuous delivery is to ensure that it takes minimal effort to deploy new code.

Continuous deployment can refer to automatically releasing a developer's changes from the repository to production, where it is usable by customers. Continuous deployment addresses the problem of overloading operations teams with manual processes that slow down delivery and builds on the benefits of continuous delivery by automating the next pipeline stage ("stage") in the CI/CD pipeline. A stage includes a set of tasks or jobs where, if every task in a given stage succeeds, then the CI/CD pipeline can transition to the next stage. If a task in the given stage fails, then CI/CD pipeline can prematurely terminate or, in some cases, move to the next stage.

Examples of pipeline stages include a build stage, a test stage, a release stage, and a deploy stage. The build stage can include a compile task that compiles software (e.g., application) to obtain a build. The test stage can include one or more testing tasks that perform one or more automated tests on the build to ensure that the build is ready for release and deployment. After the test stage, the release stage can include a release task to automatically deliver the build to a repository. The deploy stage can include a deploy task to automatically deploy the build into production.

When executed, a CI/CD pipeline implements a workflow to automatically perform the stages described above. The sequence of operations can include a sequence of commands, conditional and/or unconditional execution control transfers, etc. For example, when creating a CI/CD pipeline definition, a location of a test directory in a project can be identified, and then the CI/CD pipeline definition can be created automatically to execute one or more tests from the test directory.

In some instances (e.g., during the build stage, etc.), the build for the pipeline may fail. In larger systems, tens, hundreds, or even thousands of builds for pipelines can fail. A failed build can be caused by a variety of reasons, including compilation errors, test failures, build script issues, resource constraints, network issues, infrastructure issues, dependency problems, and version control issues. When large numbers of pipelines fail, a team or individual typically has to "retrigger" the pipelines that failed. This can result in a large use of resources. Additionally, build servers that are responsible for compiling the software for a build may be connected with application programming interfaces (API).

The systems and methods disclosed herein disclose querying (e.g., by a controller, etc.) an API connected with one or more build servers responsible for building, compiling, and our deploying pipelines for execution. The query information is then analyzed (e.g., by a rule engine, etc.) to determine if the failed builds match certain criteria. Based on whether the failed builds match the criteria, the controller may then select the pipelines to execute which had previously failed. By tailoring the execution of failed builds based on criteria of multiple (e.g., hundreds) failed builds, some or all of the pipelines can be executed in a manner that improves performance, reduces resources, improves efficiency, improves speed, or a combination thereof.

As described herein, a "rule engine" may refer to one or more software modules and/or one or more hardware modules that evaluate a set of predefined rules applied to inputs into the rule engine. The inputs can be or include information characterizing CI/CD builds (e.g., via build servers, via build logs, etc.) and make decisions or take actions based on the satisfaction of these rules. In the context of CI/CD systems, rule engines can be integrated into CI/CD workflows to enhance automation and decision-making processes. Since executing a build for all pipelines in a system that have a failed build status may require substantial resources, the rule engine can be utilized to conditionally set at least some of the pipelines with failed build statuses.

Referring now to FIG. 1, a high-level block diagram of an example computing environment 100 is shown, according to some embodiments. Computing environment 100 may include storage device 103, network 105, virtual resource cluster 107, build servers 101A-101C, and client 111. Client 111 may include development environment 123, source code 113, continuous integration build tool user interface 125, execution management component 127, build tool 110D (including compiler 115D, unit tester 117D, integration tester 119D, and continuous integration build tool 121D), and build output 131D (including compiler log 133, executable code 135, unit test log 137, and integration test log 139).

The computing environment 100 may provide build management services that include executing build operations to perform builds of source code 113 to produce build output 131D. As described herein, build services can refer to the various steps required to compile, package, and deploy source code created by developers. These "build services" may be part of the "CI" portion of CI/CD applications.

In some embodiments, the builds are performed in accordance with instructions received via continuous integration build tool user interface 125. The computing environment 100 may include build servers 101A-C for running the sets of operations for providing builds in a continuous integration environment. The builds may utilize source code 113, e.g., of an application (e.g., a web application, a desktop application, a browser application, etc.) that is being developed. In some embodiments, the application may be a messaging application, a video application, a social networking application, video sharing application, photo sharing application, chat application, mobile application of a content provider or any combination of such applications. Further, the application may be a computationally large or data-intensive application, such as a forecasting application, a modeling application, a data analysis application, etc.

The build servers 101A-C may be hosted on any type of computing node, which may be a virtualized or bare metal computing device such as a server computer, a desktop computer, a portable computing device such as, and not limited to, netbooks, laptop computers, and the like. Build tools 110A-D may be located on client 111, on build servers 101A-C, or both. Each build tool 110A-D may execute a set of operations to provide the build of the mainline code. The mainline code may be the base of a project on which development progresses. The set of operations may include compiling the code, testing the code when the code is compiled, testing isolated code when the code is added to the larger mainline code base, and performing continuous build operations e.g., performing a build at periodic intervals or in response to user requests, and presenting information about the status of executing builds and the results of completed builds. A software build job (e.g., a pipeline of one or more stages) can be executed by build tool 110A-D. Client 111 may further include execution management component 127 to dynamically generate a CI/CD pipeline mapping table to facilitate selection of effective CI/CD pipelines for execution of a change to a project.

Users, such as computer program development team members, may use a development environment 123 to submit source code 113 to the build tool 110D located on client 111 and/or to one or more build tools 110A-C located on build servers 101A-C. Users may submit source code to build tools 110A-C located on the build servers 101A-C from client 111 via network 105. Build tool 110A-D or other tool (e.g., a version control tool) may merge the submitted source code 113 with a shared mainline code base that is being stored and maintained by build server 101A-C. Users may submit source code 113 to any of the build tools 110A-D on a daily (or more frequent) basis, and request execution of a build process for the submission.

Build tool 110A-D may include a compiler 115A-D to compile computer source code 113 into executable code 135, and to generate other build output 131A-D, such as a compiler log 133 that contains output describing progress and results of the compilation process. Build tool 110A-D may include a unit tester 117A-D and an integration tester 119A-D for running automated tests on artifacts (e.g., tangible by-products produced during software development). Unit tester 117A-D may test that the individual functions in the source code 113 or executable code 135 work properly and generate unit test log 137 that contains output(s) describing progress and results of the unit tester 117A-D. Integration tester 119A-D may test the executable code 135 in an environment in which the executable code 135 is expected to be executed by users. Build tool 110A-D may include continuous integration build tool 121A-D for performing continuous build operations (e.g., performing a build at periodic intervals or in response to user requests), and presenting information about the status of executing builds and the results of completed builds. Continuous integration build tool 121A-D may start a build, e.g., by executing compiler 115A-D, unit tester 117A-D, and integration tester 119A-D in accordance with a build configuration script that contains instructions for compiling the source code and testing the resulting executable code 135. Continuous integration build tool 121A-D may monitor build output 131A-D and display progress information, such as the stage of the build (e.g., compiling, unit testing, or integration testing), the status of an executing build (e.g., how many files have been compiled, how many tests have passed, and how many tests have failed). Continuous integration build tool 121A-D may detect the completion of a build by receiving a result value from compiler 115A-D, unit tester 117A-D, and integration tester 119A-D, or by detecting particular text in the build output logs, for example. Continuous integration build tool 121A-D may generate an integration test log 139 containing information describing the progress of the operations performed by the continuous integration build tool 121A-D.

Continuous integration build tool user interface 125 may enable a user to start one or more active build jobs. Continuous integration build tool user interface 125 presents an active build list, a build queue list, and a jobs list. The jobs list includes one or more job representations, which are user-interface representations of jobs that build tool 110A-D can execute to perform builds. Instructions can be provided to build tools 110A-D (e.g., CI/CD pipelines) in the form of build files, such as build scripts or declarative descriptions of the files to be built in terms of files from which they are built. A job can be executed by build tool 110A-D. A job can include a set of stages, which may be executed sequentially. The stages can include, for example, compile, test, and deploy stages. The compile stage may translate source code to executable code, the test stage may perform tests to verify that the executable code operates correctly, and the deploy stage may install the executable code on host machines or nodes.

Figure 2:
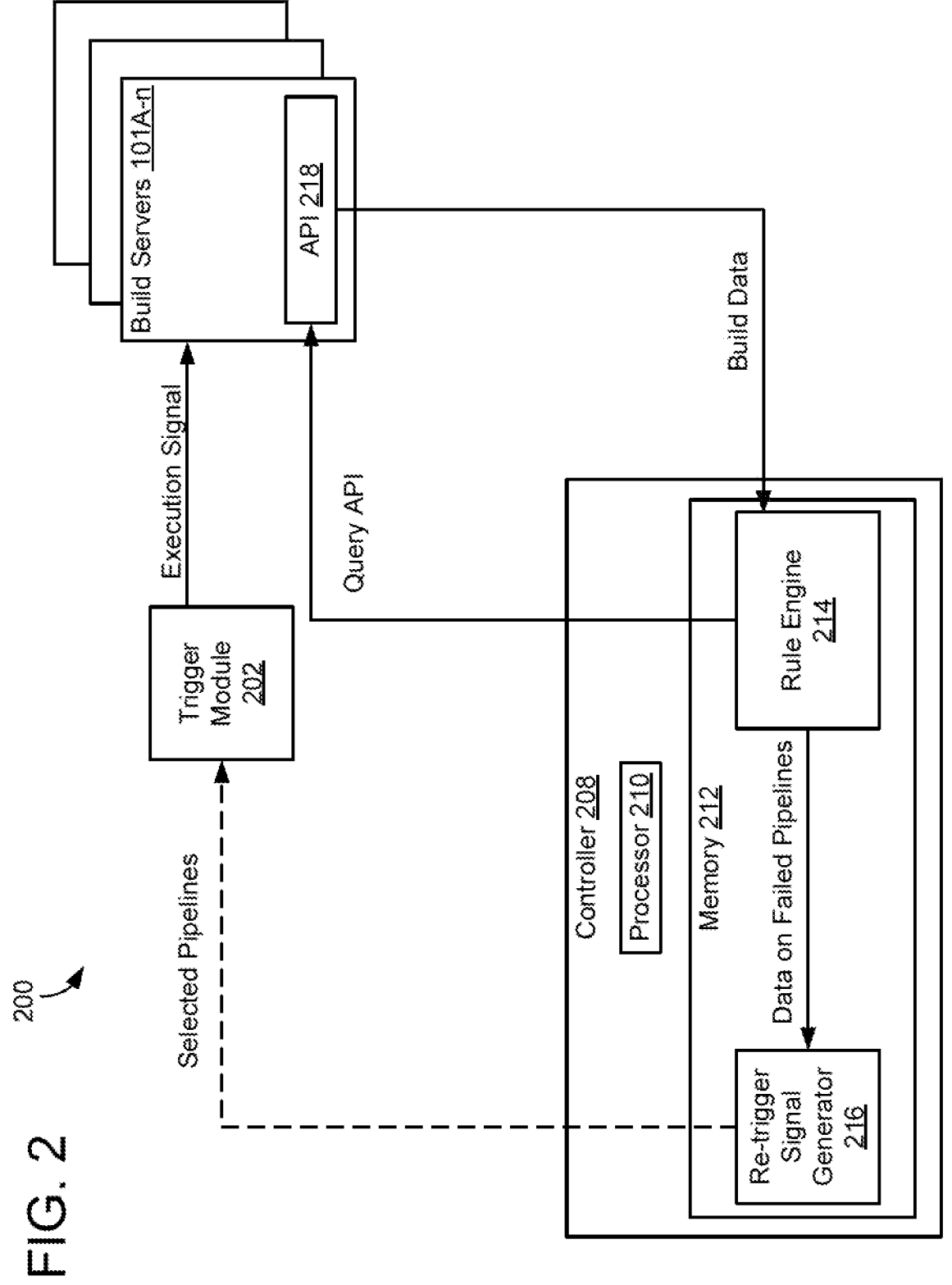
FIG. 2 depicts a block diagram illustrating a corrective action process for failed builds in a CI/CD system, in accordance with one or more aspects of the present disclosure.

Referring now to FIG. 2, CI/CD system 200 ("system 200") is shown, according to some embodiments. System 200 may be incorporated partially or entirely within system 100. For example, portions of system 200 (e.g., controller 208, etc.) may be incorporated into client 111. System 200 may include trigger module 202, build servers 101A-N, and controller 208.

Trigger module 202 may initiate one or more pipelines. The types of triggers that may be utilized by trigger module 202 can be one or more of: code commits, pull requests, scheduled triggers, triggering in response to changes submitted to a repository, periodical execution, webhooks, manual triggers, and dependency triggers. For example, trigger module 202 can be a code commit, and when a developer pushes code changes to a repository, trigger module 202 can trigger the CI/CD pipeline to start. In another example, trigger module 202 is a scheduled trigger. For example, a daily or nightly build can be scheduled to ensure that the code remains in a working state. In some embodiments, trigger module 202 is the hardware and/or software components performing the actual execution of the pipeline (e.g., sending an execution signal to build servers 101A-N, etc.). Trigger module 202 may initiate execution of pipelines (e.g., pipelines processed by build servers 101A-N, etc.) or stages thereof.

Build servers 101A-N may process pipeline stages for building and/or testing code. Build servers 101A-N may process tens, hundreds, or even thousands of pipelines, and trigger module 202 may be configured to initiate some or all of them. As described herein, build servers 101A-N may be dedicated server(s) or computing environment(s) responsible for performing the build process of software applications. In some embodiments, build servers 101A-N automate the compilation, testing, and/or packaging of an application's source code. Build servers 101A-N may also transform compiled code into executable artifacts and/or deployable packages. A pipeline executed by build servers 101A-N may include various stages (e.g., source code checkout, compilation, testing, code quality checks, packaging, etc.) and, in some embodiments, one or more of these pipelines in build servers 101A-N may fail at one or more of these stages. In some embodiments, CI/CD systems may include APIs (Application Programming Interfaces), such as API 218, that allow developers and/or teams to interact the CI/CD system.

In one example, the stages of CI/CD pipelines (e.g., which can be processed by build servers 101A-N, etc.) can include building, testing, deploying to staging, user acceptance testing (UAT), deploying to production, and/or post-deployment. In addition, each of these stages may include various operations that need to be completed before advancing to the next stage. Continuing along with the above example, the "build" stage may, for example, include the steps of checking out the source code, compiling the code, downloading any dependencies required for the application, executing testing, and performing code quality checks. When one of these steps fails, the "build" stage may be considered incomplete and can register as failed build status for the pipeline. Controller 208 may be configured to query API 218 connected with build server 101A (and/or any others described herein) to receive information about these failed builds and why they occurred.

For example, API 218 may facilitate data transmission of build data associated with builds processed by build servers 101A-N. Specifically, API 218 may to enable querying information (e.g., current build status, previous build status, build history, configuration, failure data, etc.) about one or more pipelines in build servers 101A-N.

Controller 208 may be configured to receive pipeline information via build servers 101A-N and make determinations and/or corrective steps in response to learning about failed pipeline executions. Controller 208 may include processor 210 and memory 212. The functionalities of processor 210 may be similar to processing device 702 as described below with reference to FIG. 4. The functionalities of memory 212 may be similar to main memory 704 as described below with reference to FIG. 4.

Rule engine 214 may receive one or more inputs, which may include information relating to the execution of pipelines or stages thereof processed by build servers 101A-N. For example, rule engine 214 may receive, as inputs, log data for pipelines processed by build servers 101A-N, data indicating whether a build was successful, and data indicating causes for any failed builds. Rule engine 214 may apply one or more rules to the inputs. The rules may include a condition and an action. For example, rule engine 214 may receive, as inputs, the build status of executed builds, and the failure type for any builds with a failed build status. The following rule may be applied to the inputs: if a build has a failed build status and the type of failure was due to infrastructure issues, re-execute the build.

In some embodiments, rules are applied sequentially and/or in parallel. For example, the rules are applied sequentially, whereby the first rule must be satisfied before the subsequent rules are analyzed and applied to the inputs. In another example, the rules are applied in parallel, whereby all of the rules are applied to the inputs simultaneously. In some embodiments, in response to the rules being satisfied, rule engine 214 may generate an output. In some embodiments, the outputs provided by rule engine 214 may execute or assist in executing builds that have previously failed or have previously been labeled with a failed build status.

Rule engine 214 may query API 218 for information relating to one or more builds. For example, build server 101A may be triggered to complete a pipeline, which could include a variety of stages (with each stage having multiple steps) being completed. In some embodiments, rule engine 214 determines which pipelines should be executed (e.g., a rule engine 214 may trigger one or more failed pipelines when a set of five rules of the rule engine are satisfied, etc.). For example, the rule engine has a set of rules that assess the nature of failed builds. The rules may be applied sequentially, such that when the first rule is satisfied, the subsequent rules are then analyzed and, upon all rules being satisfied, the build for the pipeline(s) are executed. In some embodiments, the rule conditions include: the pipeline has a previous build status of failure; the pipeline has a not been triggered for over a given time (e.g., 24 hours 10 days, 100 days, etc.), the pipeline failed for a particular reason (e.g., infrastructure failure, etc.); the pipeline requires more than a certain amount of resources to execute (e.g., 4 GB of RAM per step, 8 GB of RAM per step, multiple CPU cores, etc.), or a combination thereof.

In some embodiments, the rules of rule engine 214 may be sequential, as noted above. In other embodiments, only a subset (e.g., majority, etc.) of the rules may need to be satisfied. For example, rule engine 214 has two rules: (1) if a failed build is due to infrastructure issues, execute the build; and (2) if execution the pipeline requires a resource use less than 2 GB of RAM per step, execute the build. In this example, the build failed due to infrastructure issues, and execution of the build requires a resource use of 4 GB of RAM per step. Rule engine 214 may still execute the build, because Rule 1 was satisfied (despite Rule 2 not being satisfied).

In some embodiments, rules may be defined that match textual outputs, such as—stdout" or "stderr"—of a command or script for specific text patterns. In some embodiments, standard output (stdout) and standard error (stderr) are two standard streams used to handle the input and output of command-line programs and/or scripts. In system 200, stdout and stderr streams may be used to capture the output and error messages produced during the execution of various builds.

A rule evaluated by rule engine 214 may include a condition verifying whether the output of a previous build includes a specific string that may be indicative of a failure (e.g., "Failed Build Status"). This may be done be querying build logs—files that capture the events, actions, and output generated during the execution of a build process—and searching the build logs for the defined string. If the specified string is detected in a build log, the condition of the rule may be satisfied, and the action (e.g., executing the failed build, etc.) specified by the rule may be performed. In some embodiments, there is a single action taken after all rules are satisfied, and upon completion of the rule verifying whether the output of a previous build includes a specific string that may be indicative of a failure, the action for that rule is to advance to the next rule in sequence. In some embodiments, rules relating to a condition that analyzes specific strings may be used for some or all builds as an initial determination of which pipelines have previously had a failed build status.

Rule engine 214 may also consider what computing resources are available to execute certain pipelines, and conditionally select certain computing resources (e.g., to reduce resource use, to increase speed/efficiency, etc.). In some embodiments, these computing resources may be referred to as nodes (or workers, build agents, or build nodes). These computing resources may be separate computing entities (e.g., individual machines, virtual machines, etc.) with their own CPU and memory that are used to execute individual, steps of a pipeline stage, entire stages of a pipeline, and/or entire pipelines themselves.

In some embodiments, various rules within rule engine 214 may be defined and may include conditions that require computing resource thresholds to execute one or more pipelines or portions thereof. For example, one rule within rule engine 214 includes a condition that requires a certain amount of computing resources, and an action that executes a build using nodes that have more than 10 GB of RAM available. In some embodiments, the rules can be more complex and optimize the use of resources based on the available nodes. For example, if a pipeline requires 2 GB of RAM per stage, and there is a node that has 5 GB of RAM available, the node may be an appropriate choice for iteratively executing each stage in the pipeline. In another example, there are various steps that need to be completed in parallel for a pipeline (e.g., code compilation and running tests, etc.). Given this rule engine 214 may utilize multiple nodes simultaneously to complete the tasks in parallel.

In some embodiments, the query request by controller 208 includes a request for the type of build failure, and controller

208 executes builds of a certain type (e.g., of certain existing code, of builds with matching strings, etc.). This technique may be beneficial as resources would only be used to re-trigger only the failed builds that are desired. In addition, the re-trigger may be executed for only builds of a certain size. For example, controller 208 may request data from API 218 for all nodes with more than 10 GB of RAM. Controller 208 can then re-trigger only a particular set of nodes and/or builds based on the data relating to the size of the builds.

FIG. 3 depicts a flow diagram of an example method 300 for executing failed pipelines in a CI/CD system. The method may be performed by processing logic that may comprise hardware (circuitry, dedicated logic, etc.), computer readable instructions (run on a general-purpose computer system or a dedicated machine), or a combination of both. In an illustrative example, method 300 may be performed by an execution management component, such as the execution management component 127 in FIG. 1. Alternatively, some or all of method 300 might be performed by another module or machine. It should be noted that blocks depicted in FIG. 3 could be performed simultaneously or in a different order than that depicted.

Method 300 includes receiving an indication of a failure of a CI/CD pipeline of a plurality of CI/CD pipelines. (step 302). In some embodiments, controller 208 receives build status information via one or more APIs (e.g., API 218) communicably connected with build servers 101A-N. Build status information can refer to information relating to current or previous builds that have been executed (either successfully or not successfully) via build servers 101A-N. The build status information can include but is not limited to failure information (e.g., indications of whether builds were successful or not successful) previous build statuses of the pipelines, current build status pipelines, resource information (e.g., how much computing resources are required to execute builds), or a combination thereof.

Method 300 includes process build status information by a rule engine, the build status information indicative of builds executed within the plurality of CI/CD pipelines. (step 304). Rule engine 214 may process build status information received from build servers 101A-N (e.g., via API 218). Rule engine 214 may then process the information by applying one or more rules to inputs (e.g., the build status information) of rule engine 214. The rules may have conditions that, if met, which can be determined by applying the rules to the inputs), one or more actions can be taken. In some embodiments, the actions taken are directed towards selectively executing one or more builds processed by build servers 101A-N that have previously received a failed build status.

Method 300 includes apply a set of rules to the build status information to select a subset of the plurality of CI/CD pipelines, wherein the set of rules comprises one or more of a resource availability rule comprising a condition verifying that sufficient computing resources are available to execute the plurality of CI/CD pipelines; and or a failure type rule comprising a condition verifying that the CI/CD pipeline is caused by a specific failure type. (step 306). Method 300 also includes execute the subset of CI/CD pipelines selected by the rule engine (step 308). Rule engine 214 may include a variety of rules that controller 208 considers before dividing to execute pipelines. In some embodiments, these rules can act as criteria such that, if the criteria is met, the rule is considered satisfied. For example, a rule relating to available resources may be structured such that the pipeline must require than 20 GB of RAM per step. If, upon querying API 218, it is determined that a pipeline has more than 20

GB of RAM per step, that would not be satisfied for the given pipeline. Controller 208 may use the build data from API 218 as an input to rule engine 214. Rule engine 214 may then compare/analyze the build data to determine if one or more rules have been satisfied.

In some embodiments, controller 208 may receive the query results from API 218 which can include build log data for each of the plurality of pipelines processed by build servers 101A-101N. Build log data can include information about the current build status or previous build statuses and may also include build logs for any of the builds. Controller 208 may then determine that the set of rules is satisfied by determining if a string of characters is present within the build log data for each of the plurality of pipelines. For example, controller 208 queries the build logs for "Failed Build Status" and if the string appears, rule engine 214 determines that the build has a failed build status.

Other types of data can be queried by API 218, such as resource data and failure data. For example, controller 208 may receive resource data for one or more of the pipelines processed by build servers 101A-N. The resource data may indicate the amount of resources required to execute each of the plurality of pipelines or stages thereof (e.g., 10 GB of RAM per step, etc.). Rule engine 214 may then determine that the set of rules is satisfied by determining that the resource data satisfies the rule relating to available resources. While not shown in FIG. 2, controller 208 may do this by querying a plurality of available nodes connected with system 200 to determine the available computing resources.

In another example, controller 208 may receive failure data for one or more of the pipelines processed by build servers 101A-N. In some embodiments, the failure data indicates a cause for a failure (e.g., infrastructure problem, compilation issue, etc.) for one or more of the builds or pipelines. Upon receiving this data, rule engine 214 may determine if the failure data satisfies the rule relating to failure type by comparing the cause for the failure for each of the plurality of pipelines to a constraint within the rule relating to failure type. A rule within this constraint may be, for example: If cause for failure is infrastructure related, execute failed pipeline.

In another example, the set of rules in rule engine 214 includes a rule relating to a time threshold since one or more builds were previously executed. An example of this type of rule could be: If the build has not been executed in 100 days, retrigger failed build. Controller 208 could query this information from API 218 which may include a timestamp of a most recent execution for one or more of the pipelines processed by build servers 101A-N. Rule engine 214 may then determine that the set of rules is satisfied by analyzing the timestamp for each of the plurality of pipelines to determine if the time threshold has been reached.

Figure 4:
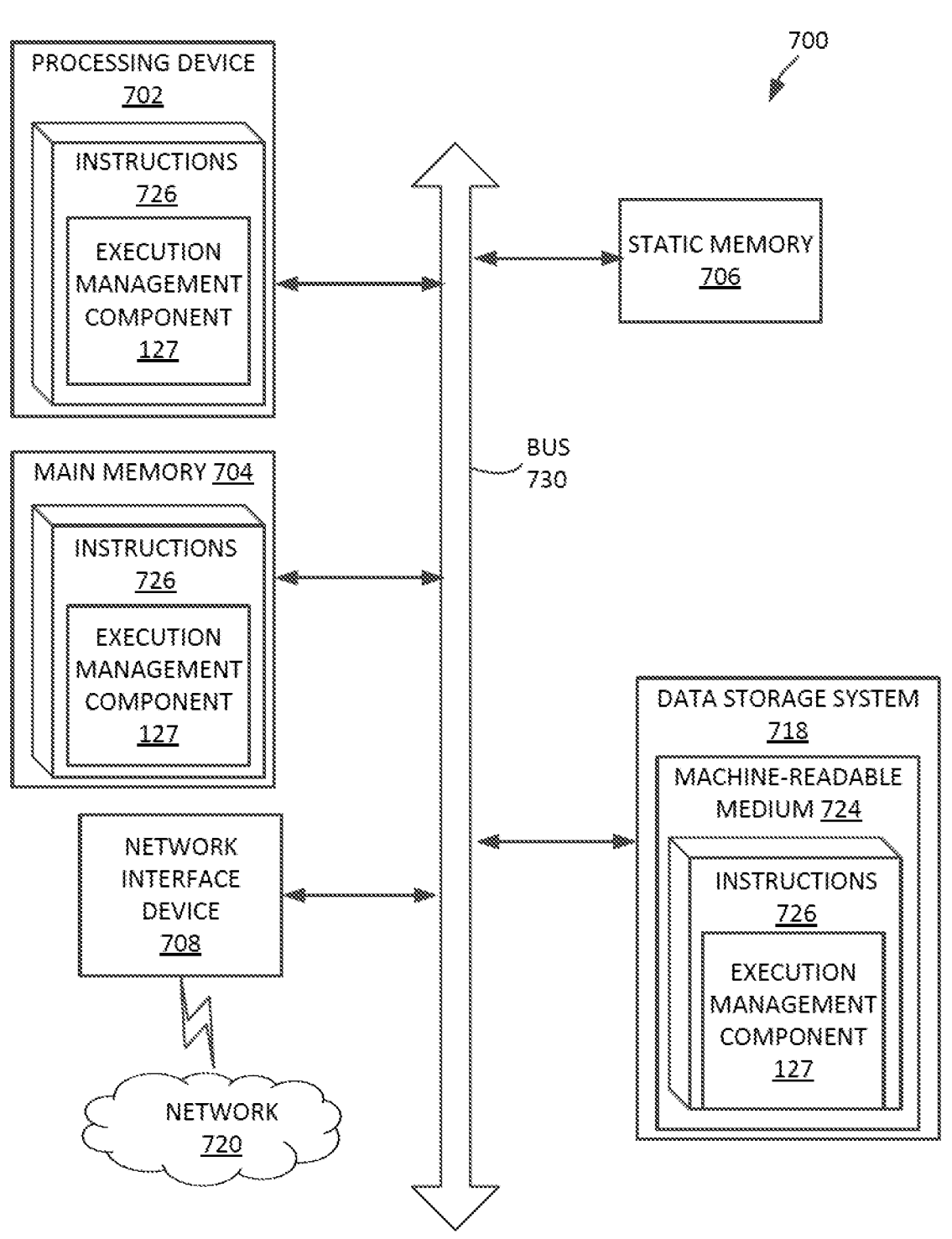
FIG. 4 depicts a block diagram of an example computer system operating in accordance with one or more aspects of the present disclosure.

FIG. 4 depicts a block diagram of a computer system operating in accordance with one or more aspects of the present disclosure. In various illustrative examples, computer system 700 may correspond to computing environment 100 of FIG. 1. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage system 718, which may communicate with each other via a bus 730.

Processing device 702 may be provided by one or more processing units such as a general purpose processing unit (such as, for example, a complex instruction set computing (CISC) microprocessing unit, a reduced instruction set computing (RISC) microprocessing unit, a very long instruction word (VLIW) microprocessing unit, a microprocessing unit implementing other types of instruction sets, or a microprocessing unit implementing a combination of types of instruction sets) or a specialized processing unit (such as, for example, an application specific integrated circuit (ASIC), a field programmable gate array (FPGA), a digital signal processing unit (DSP), or a network processing unit).

Computer system 700 may further include a network interface device 708. Data storage device 718 may include a non-transitory computer-readable storage medium 724 on which may store instructions 726 encoding any one or more of the methods or functions described herein, including instructions for implementing methods 400 and 600.

Data storage system 718 may be or include physical memory and may include volatile memory devices (e.g., random access memory (RAM)), non-volatile memory devices (e.g., flash memory, NVRAM), and/or other types of memory devices. In another example, storage device 103 may include one or more mass storage devices, such as hard drives, solid state drives (SSD)), other data storage devices, or a combination thereof. In yet another example, storage device 103 may be any virtual memory, logical memory, other portion of memory, or a combination thereof for storing, organizing, or accessing data. In a further example, data storage system 718 may include a combination of one or more memory devices, one or more mass storage devices, virtual memory, other data storage devices, or a combination thereof, which may or may not be arranged in a cache hierarchy with multiple levels.

Instructions 726 may also reside, completely or partially, within main memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system comprising:
a memory device; and
a processing device, operatively coupled with the memory device, to perform operations comprising:
executing a continuous integration, continuous delivery (CI/CD) pipeline of a plurality of CI/CD pipelines, wherein the CI/CD pipeline is configured to build executable code when executed, and wherein executing the CI/CD pipeline comprises compiling, by the CI/CD pipeline, source code to obtain the executable code;
receiving an indication of a failure of the CI/CD pipeline of the plurality of CI/CD pipelines;
processing build status information by a rule engine, the build status information indicative of builds executed within the plurality of CI/CD pipelines;
applying a set of rules to the build status information to select a subset of the plurality of CI/CD pipelines, wherein the set of rules comprises one or more of:
a resource availability rule comprising a condition verifying that sufficient computing resources are available to execute the plurality of CI/CD pipelines; or
a failure type rule comprising a condition verifying that the failure of the CI/CD pipeline is caused by a specific failure type; and
executing the subset of CI/CD pipelines selected by the rule engine.

2. The system of claim 1, wherein the set of rules further comprises a time rule comprising a condition that a maximum time has elapsed since the CI/CD pipeline has completed a most recent execution attempt; and
the build status information comprises a timestamp of the most recent execution attempt.

3. The system of claim 1, wherein the build status information comprises one or more of: a previous build status of the CI/CD pipeline, a current build status of the CI/CD pipeline, or a failure status related to the failure of the CI/CD pipeline.

4. The system of claim 1, wherein the build status information is received via an application programming interface coupled with the plurality of CI/CD pipelines.

5. The system of claim 1, wherein:
the set of rules comprises both the resource availability rule and the failure type rule; and
the rule engine is configured to select the subset of the plurality of CI/CD pipelines to execute by analyzing two or more rules of the set of rules simultaneously.

6. The system of claim 1, wherein:
the set of rules comprises both the resource availability rule and the failure type rule; and
the rule engine is configured to select the subset of the plurality of CI/CD pipelines to execute by analyzing two or more rules of the set of rules in a sequence.

7. The system of claim 1, wherein selecting the subset of the plurality of CI/CD pipelines further comprises determining whether a string of characters indicative of a failed build status is present within the build status information.

8. A method comprising:
executing, by a processing device, a continuous integration, continuous delivery (CI/CD) pipeline of a plurality of CI/CD pipelines, wherein the CI/CD pipeline is configured to build executable code when executed, and wherein executing the CI/CD pipeline comprises compiling, by the CI/CD pipeline, source code to obtain the executable code;

receiving an indication of a failure of the CI/CD pipeline of the plurality of CI/CD pipelines;

processing build status information by a rule engine, the build status information indicative of builds executed within the plurality of CI/CD pipelines;

applying a set of rules to the build status information to select a subset of the plurality of CI/CD pipelines, wherein the set of rules comprises one or more of:

a resource availability rule comprising a condition verifying that sufficient computing resources are available to execute the plurality of CI/CD pipelines; or a failure type rule comprising a condition verifying that the failure of the CI/CD pipeline is caused by a specific failure type; and executing the subset of CI/CD pipelines selected by the rule engine.

9. The method of claim 8, wherein the set of rules further comprises a time rule comprising a condition that a maximum time has elapsed since the CI/CD pipeline has completed a most recent execution attempt; and the build status information comprises a timestamp of the most recent execution attempt.

10. The method of claim 8, wherein the build status information comprises one or more of: a previous build status of the CI/CD pipeline, a current build status of the CI/CD pipeline, or a failure status related to the failure of the CI/CD pipeline.

11. The method of claim 8, wherein the build status information is received via an application programming interface coupled with the plurality of CI/CD pipelines.

12. The method of claim 8, wherein:

the set of rules comprises both the resource availability rule and the failure type rule; and the rule engine is configured to select the subset of the plurality of CI/CD pipelines to execute by analyzing two or more rules of the set of rules simultaneously.

13. The method of claim 8, wherein:

the set of rules comprises both the resource availability rule and the failure type rule; and the rule engine is configured to select the subset of the plurality of CI/CD pipelines to execute by analyzing two or more rules of the set of rules in a sequence.

14. The method of claim 8, wherein selecting the subset of the plurality of CI/CD pipelines further comprises determining whether a string of characters indicative of a failed build status is present within the build status information.

15. A non-transitory computer-readable storage medium storing instructions that, when executed by a processing device, cause the processing device to perform operations comprising:

executing a continuous integration, continuous delivery (CI/CD) pipeline of a plurality of CI/CD pipelines, wherein the CI/CD pipeline is configured to build executable code when executed, and wherein executing the CI/CD pipeline comprises compiling, by the CI/CD pipeline, source code to obtain the executable code;

receiving an indication of a failure of the CI/CD pipeline of the plurality of CI/CD pipelines;

processing build status information by a rule engine, the build status information indicative of builds executed within the plurality of CI/CD pipelines;

applying a set of rules to the build status information to select a subset of the plurality of CI/CD pipelines, wherein the set of rules comprises one or more of:

a resource availability rule comprising a condition verifying that sufficient computing resources are available to execute the plurality of CI/CD pipelines; or a failure type rule comprising a condition verifying that the failure of the CI/CD pipeline is caused by a specific failure type; and executing the subset of CI/CD pipelines selected by the rule engine.

16. The non-transitory computer-readable storage medium of claim 15, wherein the set of rules further comprises a time rule comprising a condition that a maximum time has elapsed since the CI/CD pipeline has completed a most recent execution attempt; and the build status information comprises a timestamp of the most recent execution attempt.

17. The non-transitory computer-readable storage medium of claim 15, wherein the build status information comprises one or more of: a previous build status of the CI/CD pipeline, a current build status of the CI/CD pipeline, or a failure status related to the failure of the CI/CD pipeline.

18. The non-transitory computer-readable storage medium of claim 15, wherein the build status information is received via an application programming interface coupled with the plurality of CI/CD pipelines.

19. The non-transitory computer-readable storage medium of claim 15, wherein:

the set of rules comprises both the resource availability rule and the failure type rule; and the rule engine is configured to select the subset of the plurality of CI/CD pipelines to execute by analyzing two or more rules of the set of rules simultaneously.

20. The non-transitory computer-readable storage medium of claim 15, wherein:

the set of rules comprises both the resource availability rule and the failure type rule; and the rule engine is configured to select the subset of the plurality of CI/CD pipelines to execute by analyzing two or more rules of the set of rules in a sequence.

* * * * *